United States Patent [19]

Samborsky

[11] Patent Number: 4,729,236
[45] Date of Patent: Mar. 8, 1988

[54] AUTOMATIC ORIFICE CALIBRATOR
[75] Inventor: Andrew M. Samborsky, Joppa, Md.
[73] Assignee: The United States of America as represented by the Secretary of the Army, Washington, D.C.
[21] Appl. No.: 940,884
[22] Filed: Dec. 12, 1986
[51] Int. Cl.⁴ .................. G01M 19/00; G01F 25/00
[52] U.S. Cl. ........................... 73/3; 73/861; 73/865.9; 364/510
[58] Field of Search ............ 73/3, 38, 861, 865.9, 73/168; 364/571, 510

[56] References Cited
U.S. PATENT DOCUMENTS

| | | | |
|---|---|---|---|
| 4,331,262 | 5/1982 | Snyder et al. | 73/3 X |
| 4,501,972 | 2/1985 | Foerster, Jr. et al. | 73/3 X |
| 4,502,318 | 3/1985 | Converse, III et al. | 73/3 |
| 4,509,371 | 4/1985 | Wellman | 73/3 X |
| 4,590,790 | 5/1986 | Hicks et al. | 73/3 |
| 4,645,174 | 2/1987 | Hicks | 73/3 X |
| 4,671,109 | 6/1987 | Halmi | 73/3 X |

Primary Examiner—Tom Noland
Attorney, Agent, or Firm—Anthony T. Lane; Edward Goldberg; Michael C. Sachs

[57] ABSTRACT

An orifice is calibrated by passing air through the orifice and into a tube carrying a water column. The rate at which the water in the water column falls due to the passage of air through the orifice is measured to find the volumetric flow and elapsed time of air passing through the orifice. A computer is then used to subject the volumetric flow and elapsed time data to a regression analysis to produce an equation of displacement as a function of elapsed time. The first derivative of this equation is the flow rate. A correlation coefficient of the equation is printed, and the volumetric and mass flow rates may be printed if desired.

6 Claims, 1 Drawing Figure

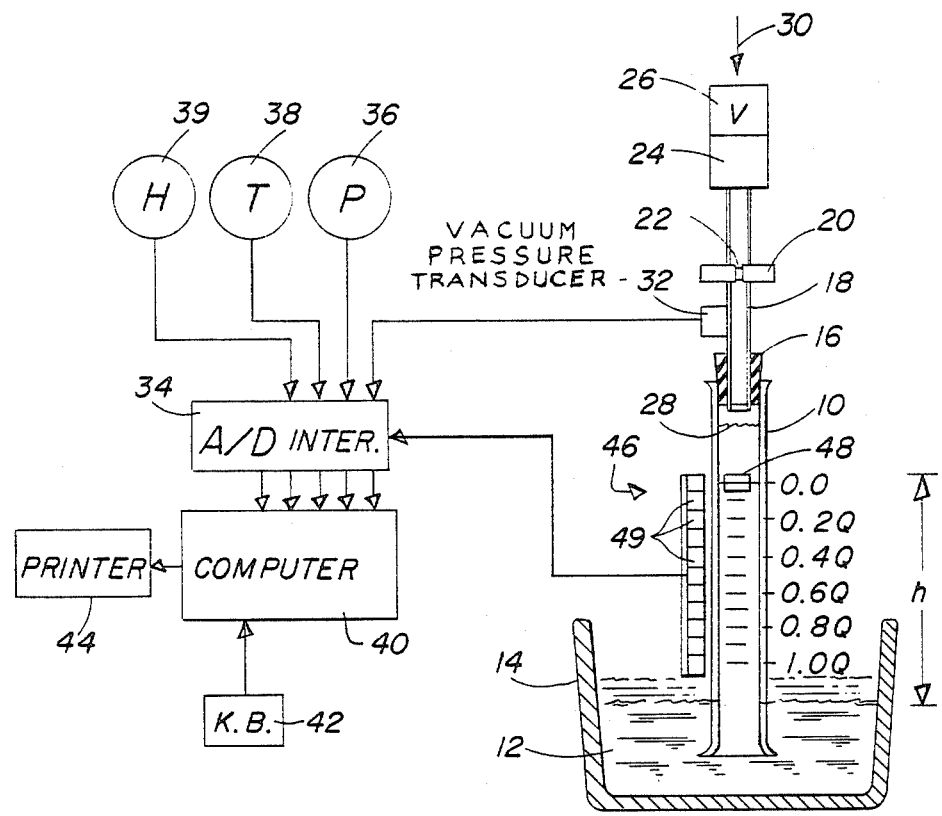

AUTOMATIC ORIFICE CALIBRATOR

STATEMENT OF GOVERNMENT INTEREST

The invention described herein may be manufactured, used and licensed by or for the Government for Governmental purposes without the payment of any royalties thereon.

FIELD AND BACKGROUND OF THE INVENTION

The present invention relates in general to calibration techniques, and in particular to a new and useful device and method for automatically calibrating an orifice or flow meter.

Glass orifices are known which are used in various fields of technology. Some small orifices are burned with a laser through a small stainless steel disc. The disc can conveniently function with an orifice holder for attaching the orifice to calibration equipment or alternately to the equipment in which the orifice is to be used.

Up to the present time, such orifices have been calibrated using a tedious manual method. Such a method requires an inordinate amount of time to accomplish and is vulnerable to operator error.

In the manual flow method, a soap bubble membrane is created in a tube and the membrane is observed as it passes two points of the tube. The volume between these two points is known. The elapsed time is recorded with a stopwatch. This yields the volume per unit time or flow rate. Flow is established by drawing fluid from the tube and through the orifice.

A technician who practices the soap bubble method must be present to visually note and record elapsed time and volume. Observations are subject to human error. Frequently the bubble membrane will burst. This requires the formation of a new bubble membrane and restarting of the method.

Atmospheric conditions also affect the sucessfully developed bubble membrane. The procedure is also time consuming since the technician must personally attend to the apparatus continuously.

SUMMARY OF THE INVENTION

The present invention is an apparatus and a method which utilizes a computer to automatically record flow as a function of time. The flow is a function of the head or pressure in a tube to which flow occurs through the orifice to be calculated.

According to the invention, the computer uses regression analysis to solve for and apply a parabolic equation of the form:

$$Y = kX^n \qquad (1)$$

wherein X and Y are the two coordinates on which the characteristic curve is to be plotted.

It is noted that a unity correlation coefficient is theoretically possible with round off to two digital place since Poiseville's equation (1842) and the subsequent D'Arcy equation and Torricelli's Theorem disclose parabolic form.

According to the invention, Y can be taken as the Accumulated Volume Passing through the orifice and X can be taken as the elapsed time.

The computer then derives an equation for accumulated volume versus time and prints a correlation coefficient and tabulates or plots the curve of the first derivative in cc/min. or any other units for which the computer is programmed.

According to the invention, a tube which is open at both ends is fitted with the orifice at its upper end. The lower end of the tube is positioned in a supply of liquid, such as water at constant level and air is drawn down through the tube. This drops the liquid in the tube at a rate related to the orifice and head pressure. The equipment may be mechanically improved by automating the liquid changing system to repeat the mesurement several times. With programmed error analysis, accuracies can be achieved which were not possible with the manual techniques. The time it takes the liquid to fall in the tube can be measured by a transducer which senses the level of liquid in the tube. This measurement is converted to a digital signal and supplied to the computer. The head pressure in the tube is also measured and supplied as a digital signal to the computer. The computer may also receive signals corresponding to humidity, temperature and ambient or atmospheric pressure. These additional signals can be used as correction factors for varying environmental conditions. Suitable transducers and computer program looping can thus assure maximum accuracy. A computer printout for the correlation coefficient can also include confidence limits, instantaneous rate of change of volume at a preselected head pressure as well as corrections for atmosphere pressure, temperature, humidity, local acceleration due to gravity, viscosity and density.

The scientific principle involved is that the characteristic curve for flow is in fact a parabola and application is made of regression analysis to arrive at a precise parabolic empirical equation describing experimental data of the apparatus. Application is made of calculus to solve for the change of volume with respect to elapsed time at a particular vacuum head at the top of the tube and to which the orifice is subjected.

Accordingly, an object of the present invention is to provide a method of calibrating an orifice which comprises passing a gas through the orifice and into a column of liquid to cause the level of liquid in the column to fall, reducing pressure, and calculating the rate at which the column falls, which is a measurement of the volumetric flow rate of the gas into the column and using regression analysis to arrive at a parabolic equation for displacement, whose first derivative is an equation of the flow rate of the gas through the orifice.

A further object of the invention is to provide an apparatus for practicing the method.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

Referring to the FIGURE, the apparatus used for the automatic orifice calibration method comprises a tube 10 which has open upper and lower ends. The lower end of tube 10 is immersed in water 12 contained in a container 14 and exposed to atmospheric pressure. The cross-sectional area of 14 is very large compared to the cross-sectional area of 10, in order to retain virtually constant level during the test. A cork 16 closes the upper open end of tube 10. Cork 16 receives a tube 18 which carries an orifice holder 20 in which an orifice 22 is provided for calibration. A filter 24 is connected to the upper end of tube 18 and a valve 26 is connected above the filter 24. Water is drawn to level 28, valve 26 is then closed. With the water raised to level 28, valve 26 can be opened to admit air in the direction of arrow 30. The air is filtered at filter 24 and passes through orifice 22 into the upper end of tube 10. The water level 28 then drops. The height change in the water level h, where h=Q. Q corresponds to the volume flow Q of air through orifice 22.

A vacuum pressure transducer 32 is connected to tube 18 for sensing the vacuum head h at tube 10. Transducer 32 sends a signal to analog-to-digital interface 34 which converts the analog pressure signal to a digital signal which is supplied to computer 40. In addition, successive stages of pressure is transmitted by liquid level transducer 46. Also connected to A/D interface 34 may be an atmospheric pressure transducer 36, a temperature transducer 38 and a humidity transducer 39, for correcting to standard conditions.

A keyboard 42 is connected to computer 40 for activating the computer to receive the various digital signals. The keyboard also includes a key for activating a printer 44.

Computer 40 incorporates a timer which is used to time successive stages of the level of liquid 28 as it drops in tube 10. To this end, tube 10 is provided with a liquid level transducer generally designated 46. Liquid level transducer 46 depicted includes a magnetic float 48 which cooperates with a plurality of magnetic pickups 49 that sense the presence of magnetic float 48 at discrete levels (ten in the embodiment shown) along tube 10. Any other liquid level detector can be used to replace transducer 46, such as an optical system or the like.

In practicing the method of the invention, valve 26 is opened and water 12 is first drawn up into tube 10 until the water level reaches maximum level 28. Then valve 26 is closed. Computer 40 is then turned on and commands valve 26 to open to allow air to pass through orifice 22 in the direction of arrow 30. As the liquid level 28 drops past the magentic pickups 49, computer 40 records the vacuum head h at each stage of displacement and the elapsed time. The test is stopped by the computer if elapsed time pulses are received too rapidly. This condition would indicate that the orifice 22 is too large for the burette being used, or a malfunction has occurred in the system, and is detected by a difference in indicated level between 46 and 32. The size of tube 18 is selected so that a free flow of air occurs and the vacuum pressure change of water column h is uniform. Valve 26 is also oversized so that in its full open position a negligble head loss occurs at the test flow rate. Negligible head loss should also occur through filter 24 which may for example be a simple cigarette filter or a small electrostatic filter.

After valve 26 is opened, the level transducer 46 which is triggered by the passage of float 48, signals computer 40 which in turn notes and stores the volume of liquid past and elapsed time t. The tube capacity Q, the change in tube capacity ΔQ, the column head h and elapsed times are stored and can be printed out on request. The data point 1.0 Q initiates regression analysis followed by printing of the correlation coefficient, and instantaneous rate of change of volume at each preselected head pressure curve.

The method of the present invention is far faster and much more accurate than the prior art techniques. It is also more repeatable and less demanding on the skills of the operator.

The equation used by computer 40 has been verified as to its parabolic form by using Torricelli's theorem and letting volume Q be numerically equal to h. Then from:

$$V = \sqrt{2gh} \tag{2}$$

$$V \alpha \sqrt{2gQ} \tag{3}$$

where V is the velocity of the liquid level 28 and g is the acceleration of gravity, and since the flow rate, neglecting losses, equals velocity times area:

$$\frac{dQ}{dt} = VA \tag{4}$$

$$dQ = A\sqrt{2gQ} \cdot dt \tag{5}$$

$$\frac{dQ}{Q^{\frac{1}{2}}} = A\sqrt{2g} \cdot dt \tag{6}$$

$$2Q^{\frac{1}{2}} = A\sqrt{2g} \cdot t \tag{7}$$

$$Q = kt^2 \tag{8}$$

It is noted that equation (8) is the same as equation (1) above, the general equation of a parabola.

The present invention was used in an actual experiment to calibrate orifices. Each was calibrated using the apparatus of the invention by passing dry air of commercial breathing quality through the orifices into the tube 10. Measurements of the volume flow, Q, and time t, established the rate of flow, m, which equals dq/dt.

The density was based on the existing ambient pressure and temperature. The glass orifices were connected into the flow by friction fitting them into ⅜ inch soft plastic tubing 18 (nominal ID 0.25 inches).

In general operation of the device shown in the drawing, values for Q and h are stored as a function of elapsed time which is measured. Signal processing is stopped at the level 1.0Q and then the printer is activated to print out equation (1), namely:

$$Y = kX^n \tag{1}$$

The correlation coefficient and dQ/dt as a function of h is also printed out in cc/min. at desired h values.

While a specific embodiment of the invention has been shown and described in detail to illustrate the application of the principles of the invention, it will be understood that the invention may be embodied otherwise without departing from such principles.

What is claimed is:

1. A method of calibrating an orifice, comprising passing a gas through the orifice into a column of liquid in a tube and measuring the time it takes for a specific volume and head pressure to occur in the tube, maintaining equality between a vacuum head and the liquid level in the tube, measuring the time for the liquid level changes in the tube, and the volumetric flow of gas into the tube, and applying regression analysis of the volumetric flow with time to form a characteristic parabolic curve, whose first derivative is the flow rate characteristic of the orifice.

2. A method according to claim 1, including defining a plurality of levels for the liquid in the tube and measuring the elapsed time it takes for the liquid level to pass each tube level to measure the volumetric flow rate.

3. A method according to claim 2, including sensing the passage of a magnetic float on the liquid level for detecting the liquid level.

4. A method according to claim 2, including using a computer to apply the regression analysis, the computer receiving the signals corresponding to the measured vacuum pressure and to the measured time at which the liquid level falls.

5. An apparatus for calibrating an orifice comprising a liquid column having a lower end for insertion into a liquid and an upper end, a flow tube connected to said upper end of said column tube and defining a flow passage, valve means at an end of said flow tube remote from said column tube for selectively admitting gas into said flow tube to pass through said flow passage, a pressure transducer in said flow tube between said orifice holder and said column tube for measuring a vacuum head pressure in said column tube, liquid level sensing means operatively connected to said column tube for sensing the level of liquid in said column tube and computer means connected to said pressure transducer and to said liquid level sensor means, said computer having timing means for timing the successive liquid levels in said column tube and for calculating a parabolic characteristic curve using regression analysis which is characteristic of an orifice held by said orifice holder.

6. A device according to claim 5 wherein said liquid level sensor means comprises a magnetic float for floating on a liquid level in said column tube and a plurality of magnetic pickups distributed along said tube column for sensing the passage of said float.

* * * * *